(12) United States Patent
Bates, Jr. et al.

(10) Patent No.: US 11,970,225 B2
(45) Date of Patent: Apr. 30, 2024

(54) SNOW TRACK FOR A SNOWMOBILE

(71) Applicant: Polaris Industries Inc., Medina, MN (US)

(72) Inventors: Richard H. Bates, Jr., Badger, MN (US); Thomas D. Rager, Jr., Marathon, WI (US)

(73) Assignee: Polaris Industries Inc., Medina, MN (US)

( * ) Notice: Subject to any disclaimer, the term of this patent is extended or adjusted under 35 U.S.C. 154(b) by 1044 days.

(21) Appl. No.: 16/590,762

(22) Filed: Oct. 2, 2019

(65) Prior Publication Data

US 2021/0101652 A1 Apr. 8, 2021

(51) Int. Cl.
*B62D 55/24* (2006.01)
*B62D 55/18* (2006.01)
*B62D 55/26* (2006.01)
*B62D 55/28* (2006.01)

(52) U.S. Cl.
CPC .......... *B62D 55/244* (2013.01); *B62D 55/18* (2013.01); *B62D 55/26* (2013.01); *B62D 55/286* (2013.01)

(58) Field of Classification Search
CPC ...... B62D 55/244; B62D 55/26; B62D 55/18; B62D 55/24
See application file for complete search history.

(56) References Cited

U.S. PATENT DOCUMENTS

| | | | |
|---|---|---|---|
| 4,244,436 A | 1/1981 | Condon et al. | |
| 6,406,106 B1 * | 6/2002 | Moss | B62D 55/244 305/165 |
| 6,722,746 B2 * | 4/2004 | Katayama | B62D 55/24 305/179 |
| 6,733,091 B2 * | 5/2004 | Deland | B62D 55/244 305/178 |
| 6,840,588 B2 * | 1/2005 | Deland | B62D 55/24 305/179 |
| 7,048,344 B2 * | 5/2006 | Courtemanche | B62D 55/244 305/165 |
| 7,347,512 B2 | 3/2008 | Dandurand | |

(Continued)

FOREIGN PATENT DOCUMENTS

| | | | | |
|---|---|---|---|---|
| CA | 2792114 A1 * | 4/2014 | | B62D 55/04 |
| WO | 2007095738 A1 | 8/2007 | | |

OTHER PUBLICATIONS

Canadian Office Action regarding Patent Application No. 3095138, dated Sep. 2, 2022.

(Continued)

*Primary Examiner* — Jason R Bellinger
(74) *Attorney, Agent, or Firm* — Harness, Dickey & Pierce, P.L.C.

(57) ABSTRACT

An endless track for use in propelling a snowmobile. The endless track extends between a first lateral side and a second lateral side and includes an inner drive surface and an outer ground-engaging surface. The inner drive surface includes a plurality of longitudinally spaced inner drive lugs used to drive and rotate the endless track. The outer ground-engaging surface includes a plurality of treads, where each tread extends continuous and uninterrupted along a constant height from the first lateral side to the second lateral side a full width of the endless track.

23 Claims, 8 Drawing Sheets

(56) References Cited

U.S. PATENT DOCUMENTS

| | | | |
|---|---|---|---|
| 7,533,945 B2* | 5/2009 | Jee | B62D 55/244 |
| | | | 305/171 |
| 7,618,102 B2 | 11/2009 | Dandurand | |
| 7,806,487 B2 | 10/2010 | Paradis et al. | |
| 8,708,432 B2* | 4/2014 | Pard | B62D 55/12 |
| | | | 305/195 |
| 9,334,000 B2* | 5/2016 | Nomizo | B62D 55/26 |
| 10,875,605 B2 | 12/2020 | Pard | |
| 10,953,937 B2* | 3/2021 | Laplante | B62D 55/244 |
| 2004/0178677 A1 | 9/2004 | St-Pierre et al. | |
| 2005/0156466 A1* | 7/2005 | Dandurand | B62D 55/18 |
| | | | 305/178 |
| 2007/0063584 A1 | 3/2007 | St-Pierre | |
| 2011/0155482 A1 | 6/2011 | Courtemanche et al. | |
| 2013/0048392 A1* | 2/2013 | Arcouette | B62D 55/244 |
| | | | 180/9.1 |
| 2013/0134772 A1 | 5/2013 | Dandurand et al. | |
| 2013/0241278 A1 | 9/2013 | Nomizo | |
| 2016/0114841 A1* | 4/2016 | Gagne | B62D 55/244 |
| | | | 180/9.62 |
| 2018/0265146 A1* | 9/2018 | Laplante | B62D 55/125 |

OTHER PUBLICATIONS

Canada-Office Action corresponding to CA 3095138, dated Jun. 1, 2023.

* cited by examiner

SNOW TRACK FOR A SNOWMOBILE

FIELD

The present disclosure relates to an endless track and, more particularly, to a snow track having a full lateral width and height tread for use on a tracked vehicle, such as a snowmobile.

BACKGROUND

This section provides background information related to the present disclosure which is not necessarily prior art.

Tracked vehicles, such as a snowmobile, include an endless track or belt that is driven by a snowmobile drive assembly. These drive assemblies generally have a pair of spaced apart wheel structures on opposed sides or ends of the snowmobile to carry and drive the track.

The track can typically include an outer ground-engaging surface and an inner drive surface. The inner drive surface will generally include a series of longitudinally spaced lugs or members that are driven by a drive sprocket of the snowmobile and are also used for guiding relative to a rail beam or slide, as is known in the art. The ground-engaging surface of a typical track will include various tread configurations that are both spaced apart and non-continuous both longitudinally and laterally relative to the track for use in engaging various types of snow conditions.

Such tracks can provide good forward momentum of snowmobiles but may cause higher side biting of the track in turns. Additionally, various tread patterns that are separately spaced apart longitudinally and laterally on the track may not provide optimal forward momentum. Accordingly, there is a need to provide an improved track that enables improved cornering speed with reduced side bite, as well as improved forward bite and hole shot in all snow conditions.

SUMMARY

This section provides a general summary of the disclosure, and is not a comprehensive disclosure of its full scope or all of its features.

An endless track for use in propelling a snowmobile. The endless track includes an inner drive surface extending between a first lateral side and a second lateral side and an outer ground-engaging surface extending between the first lateral side and the second lateral side. The inner drive surface includes a plurality of inner drive lugs used to drive and rotate the endless track. The outer ground-engaging surface includes a plurality of treads extending from the outer ground-engaging surface. At least one of the treads extends continuous and uninterrupted from the first lateral side to the second lateral side a full width of the endless track.

The endless track is used for propelling a snowmobile. The endless track includes the inner drive surface and the outer ground-engaging surface, each extending between the first lateral side and the second lateral side. The inner drive surface has a plurality of longitudinally spaced inner drive lugs used to drive and rotate the endless track. The outer ground-engaging surface includes the plurality of treads. Each tread extends continuous and uninterrupted from the first lateral side to the second lateral side a full width of the endless track. Each track has a continuous height extending the full width of the endless track.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Although the following description includes several examples of a snowmobile application, it is understood that the features herein may be applied to any appropriate tracked vehicle. The examples disclosed below are not intended to be exhaustive or to limit the disclosure to the precise forms disclosed in the following detailed description. Rather, the examples are chosen and described so that others skilled in the art may utilize their teachings.

Figure 1:
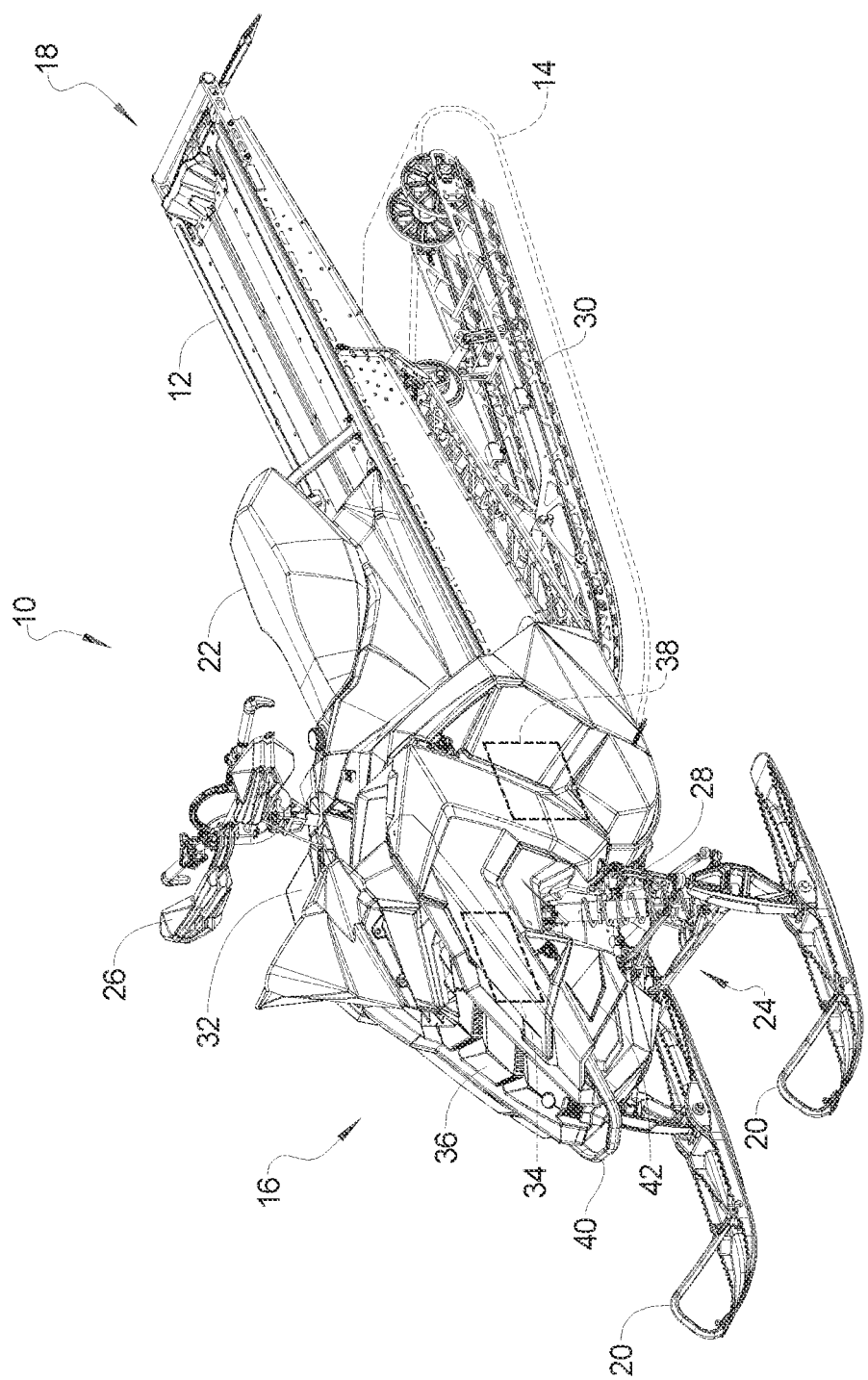
FIG. 1 is a perspective view of an exemplary snowmobile.

Referring now to FIG. 1, one embodiment of an exemplary snowmobile 10 is shown. Snowmobile 10 includes a chassis 12, an endless belt or track 14, and a pair of front skis 20. Snowmobile 10 also includes a front-end 16 and a rear-end 18.

The snowmobile 10 also includes a seat assembly 22 that is coupled to the chassis assembly 12. A front suspension assembly 24 is also coupled to the chassis assembly 12. The front suspension assembly 24 may include handlebars 26 for steering, shock absorbers 28 and the skis 20. A rear suspension assembly 30 is also coupled to the chassis assembly 12. The rear suspension assembly 30 may be used to support the endless belt 14 for propelling the snowmobile 10. An electrical console assembly 32 is also coupled to the chassis assembly 12. The electrical console assembly 32 may include various components for displaying engine conditions (i.e., gauges) and for electrically controlling the snowmobile 10.

The snowmobile 10 also includes an engine assembly 34 positioned under a hood assembly 36 of the chassis assembly 12. A drivetrain assembly 38 is used for converting a rotating force from the engine assembly 34 into a potential force to use, drive, and rotate the endless belt or track 14 and thus the snowmobile 10.

The chassis assembly 12 may also include a bumper assembly 40 and a nose pan assembly 42. The hood assembly 36 is movable to allow access to the engine assembly 34 and its associated components.

While the snowmobile 10, illustrated in FIG. 1, is generally a mountain-type snowmobile propelled by the endless track 14, any type of tracked snowmobile or tracked vehicle may employ the endless track 14 of the present disclosure. For example, touring, racing, performance, and other snowmobile configurations may be propelled by the endless track 14. The endless track 14 can work in various snow conditions, including all snow conditions such as sugar, ice, wet, heavy, as well as on various terrains. These terrains can include track, mountainous, ice, etc.

Figure 2:
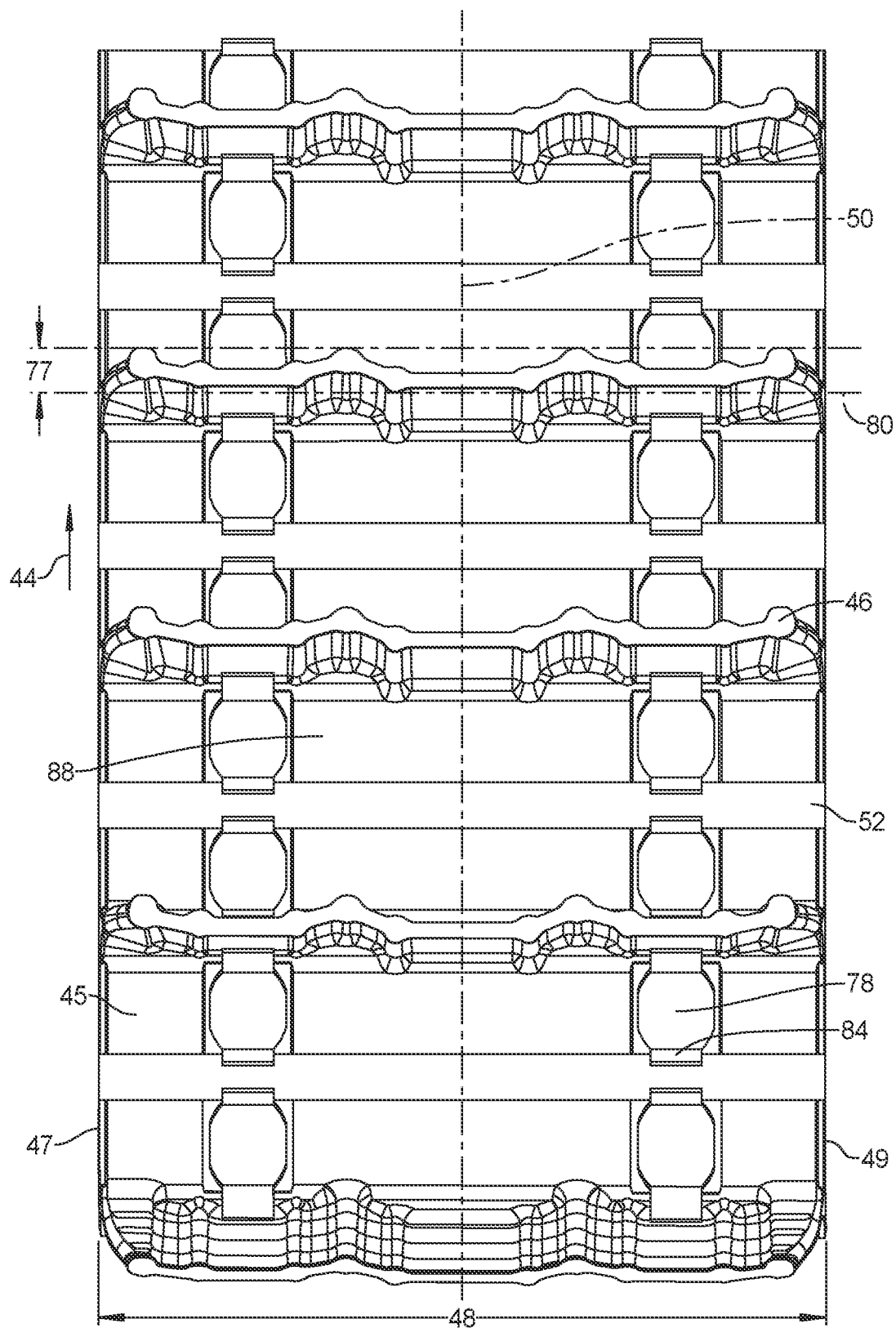
FIG. 2 is a top perspective view of an endless track.
Figure 3:
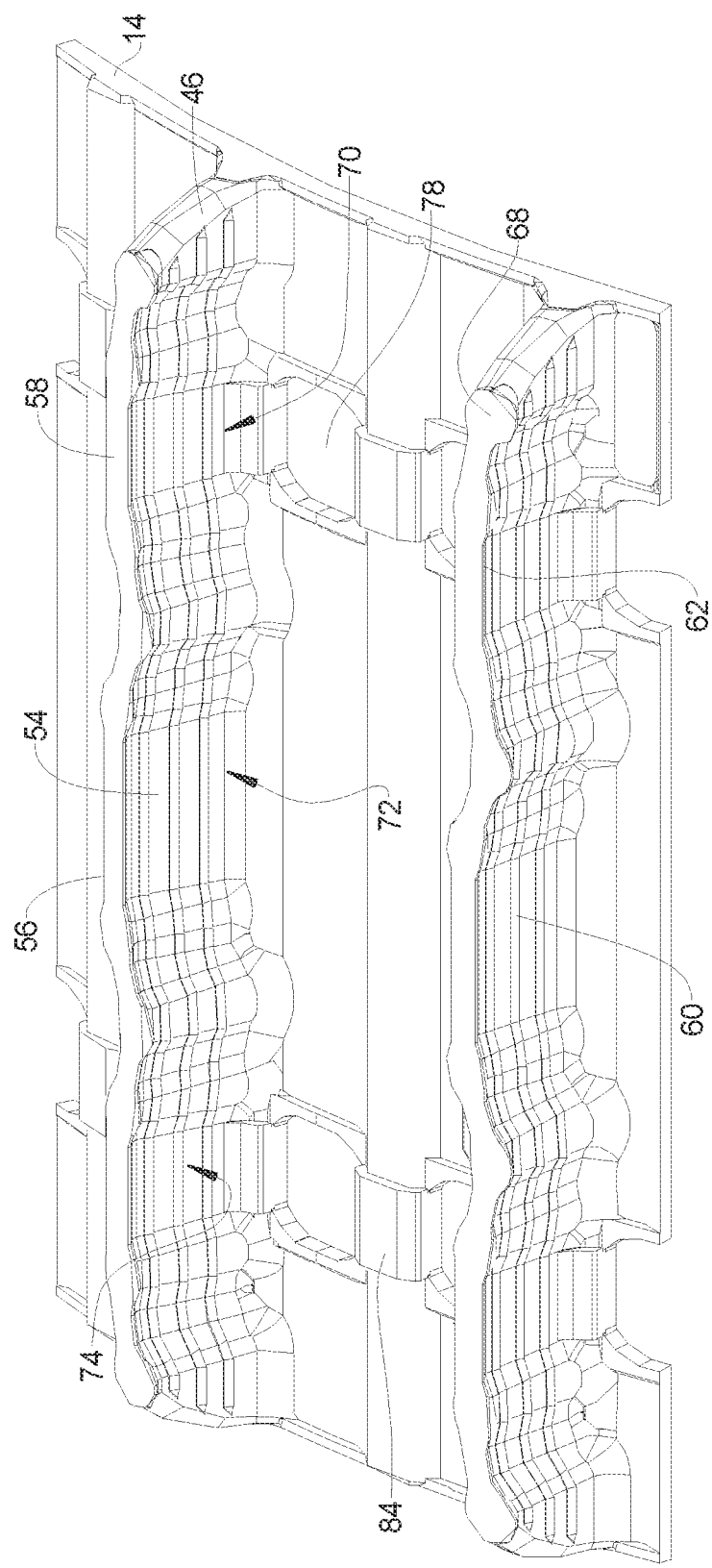
FIG. 3 is an enlarged top perspective view of a portion of the track of FIG. 2.
Figure 4A:
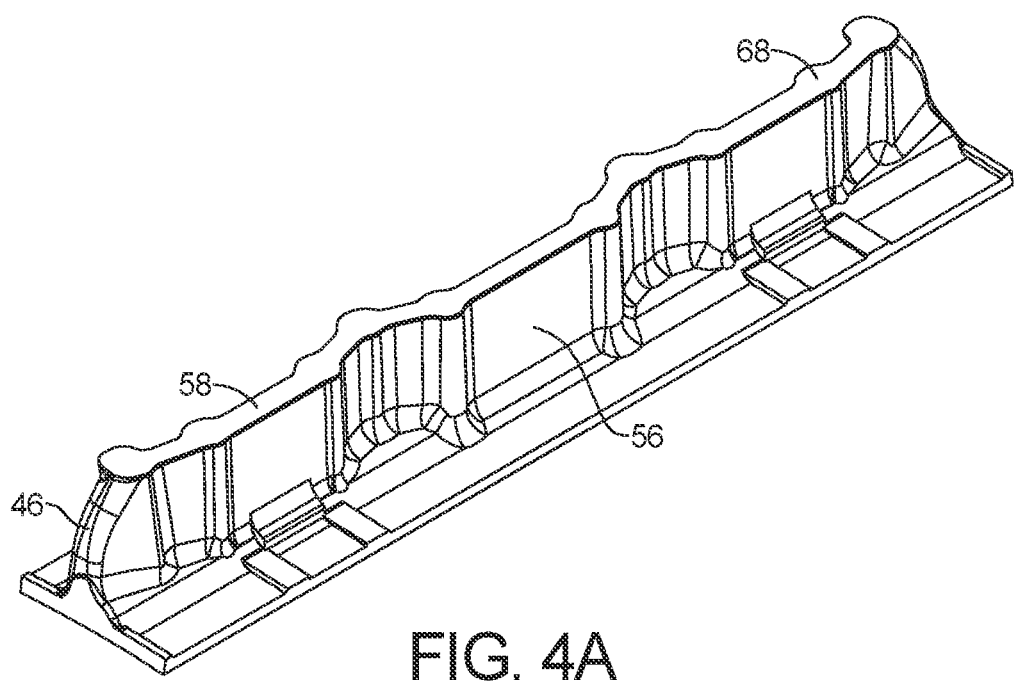
FIG. 4A is a rear perspective view of a tread of the track of FIG. 2.
Figure 4B:
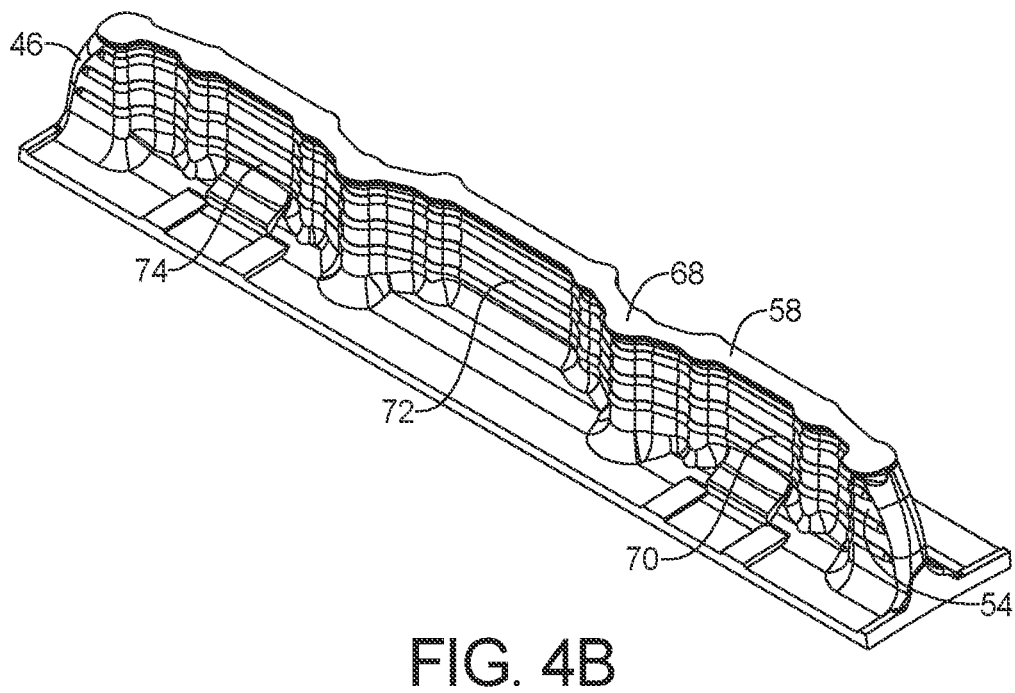
FIG. 4B is a front perspective view of the tread of the track of FIG. 2.
Figure 5:
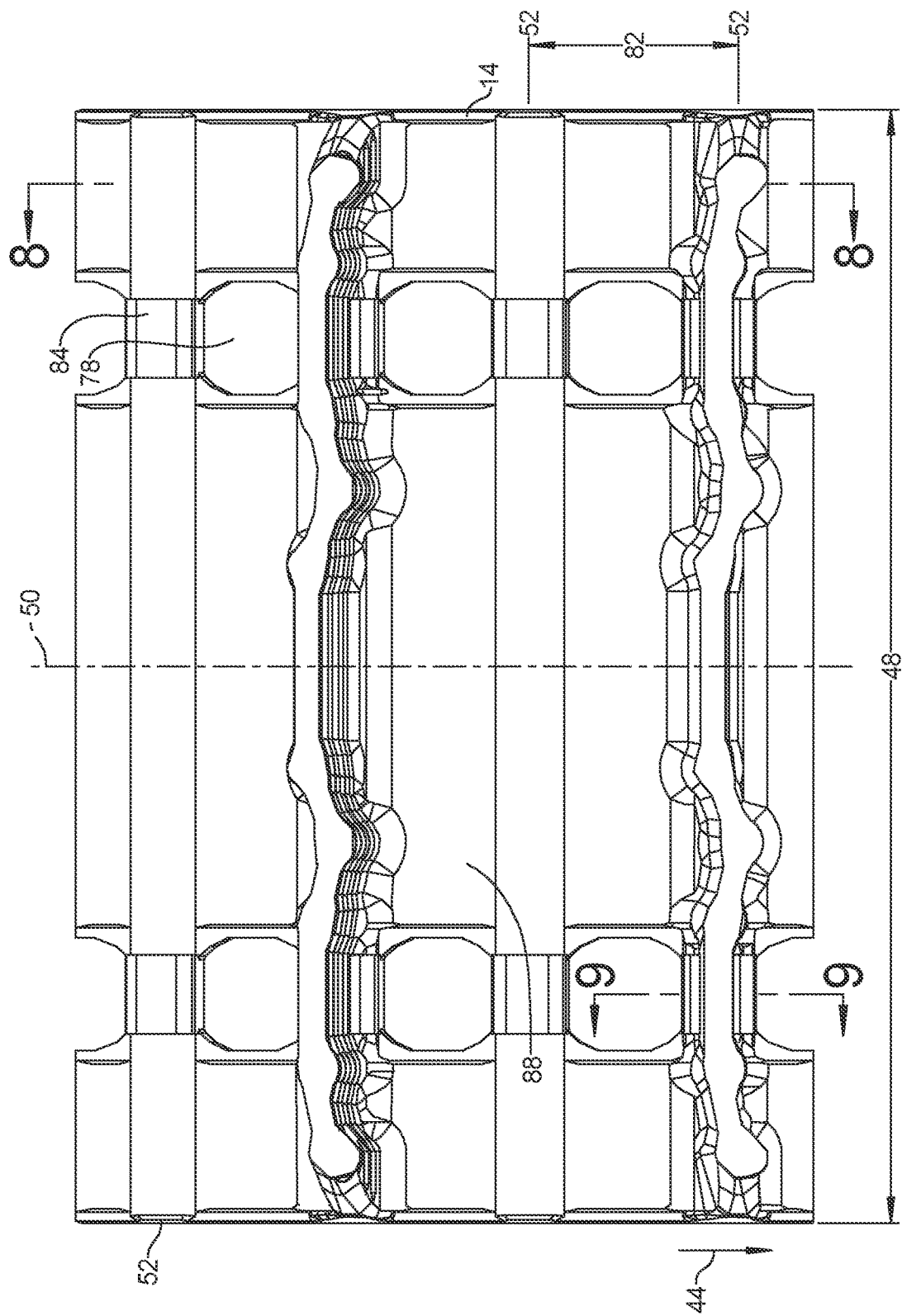
FIG. 5 is a top planar view of a portion of the track of FIG. 2.

Turning to FIGS. 2-9, the endless track 14, according to the present disclosure, is illustrated in detail. As illustrated in FIG. 2, the track 14 is a continuous track that rotates 360° in the direction of arrow 44 to propel the snowmobile 10. The track 14 is primarily formed of a rubber material, including multiple fabric layers, as is known in the art. The track 14 includes an outer ground engaging surface 45 having a plurality of extending treads or lugs 46 that are used to engage the ground or terrain and drive the snowmobile 10 generally in a forward direction 44. Each tread 46 extends the full width 48 of the track 14 laterally from a first lateral side 47 to a second lateral side 49 and is substantially perpendicular to a longitudinal axis 50 of the track 14. Each tread 46 further extends at a full height across the entire full width 48. Each tread 46 is longitudinally spaced at every other pitch 52, as clearly illustrated in FIG. 8. The tread 46 is a substantially continuous and uninterrupted tread 46 extending completely between the first lateral side 47 and the second lateral side 49. In other words, each tread 46 does not have any gaps or spacing laterally but provides a continuous uninterrupted surface spanning the entire width 48 of the track 14 at the full height.

Figure 8:
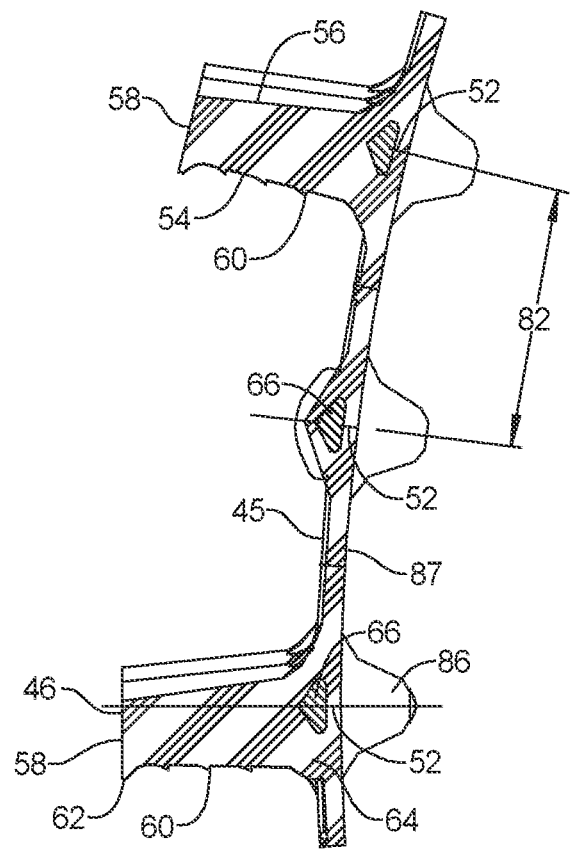
FIG. 8 is a side cross-sectional view taken through section 8-8 of FIG. 5.
Figure 9:
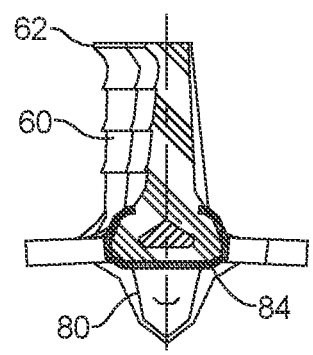
FIG. 9 is a side cross-sectional view taken through section 9-9 of FIG. 5.

Referring to FIGS. 3-6, each tread 46 includes a front surface 54, a rear surface 56, and a substantially planar top surface 58. As illustrated in FIGS. 8-9, the front surface 54 includes a plurality of ridges or ribs 60 that extend substantially the width 48 of the track 14. A distal lip 62 protrudes from the top surface 58. The lip 62 and ribs 60 provide an enhanced snow engaging front surface of the tread 46 by way of providing additional surface area, as well as a higher friction front surface for grabbing and biting into all snow conditions. Such a front surface 54 is similar to that disclosed in U.S. Pat. No. 7,618,102, hereby incorporated by reference. As illustrated in FIG. 8, each tread 46 is formed to have a wider base 64 that tapers to the narrowed top surface 58. Reinforcing each tread 46 is a reinforcing rod or bar 66 that is positioned and located at each pitch 52. Each reinforcing rod 66 traverses the entire width 48 of the track 14 and can be formed of a composite material, including fiberglass. Each reinforcing rod or bar 66 provides lateral stiffness to the track 14.

Figure 6:
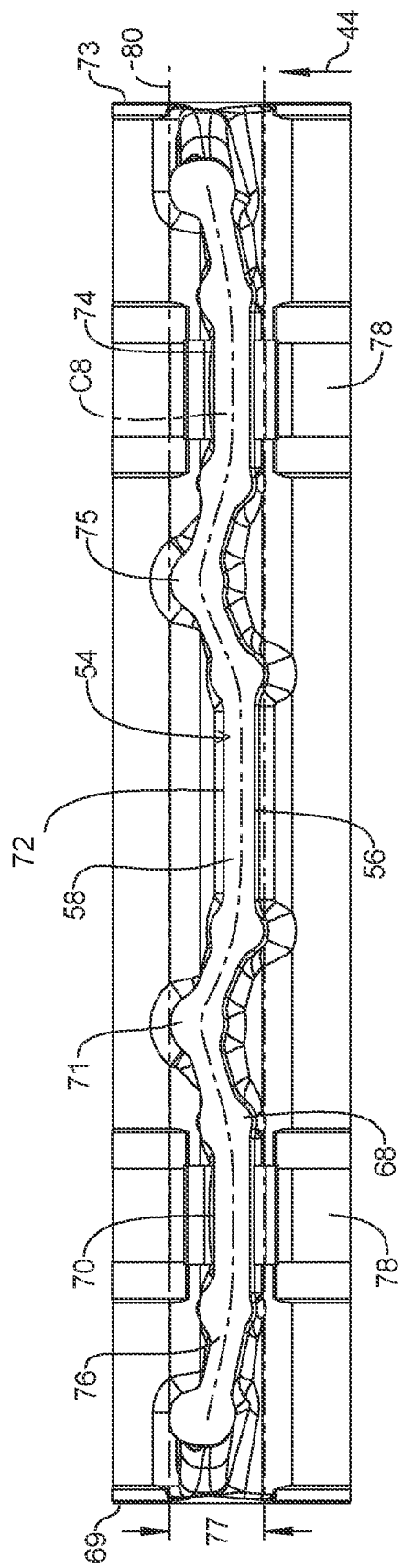
FIG. 6 is an enlarged top view of a tread of the track of FIG. 2.
Figure 7A:
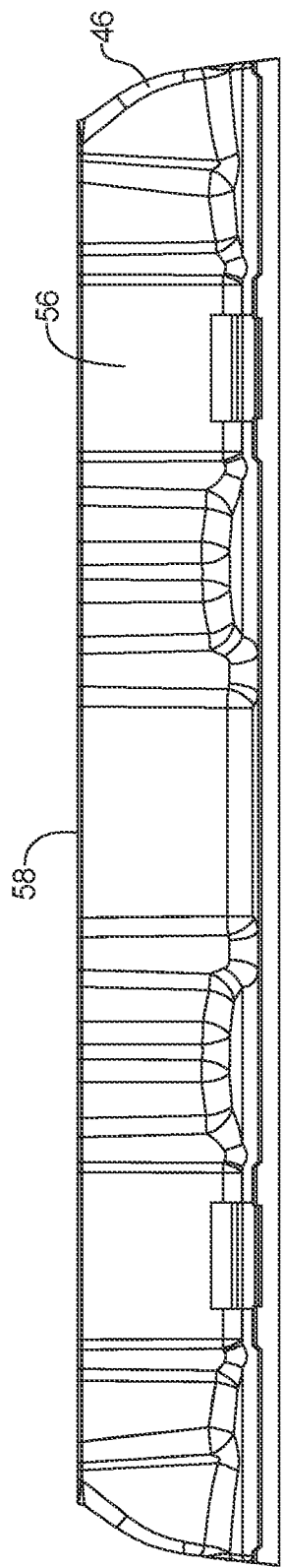
FIG. 7A is a rear planar view of a tread of the track of FIG. 2.
Figure 7B:
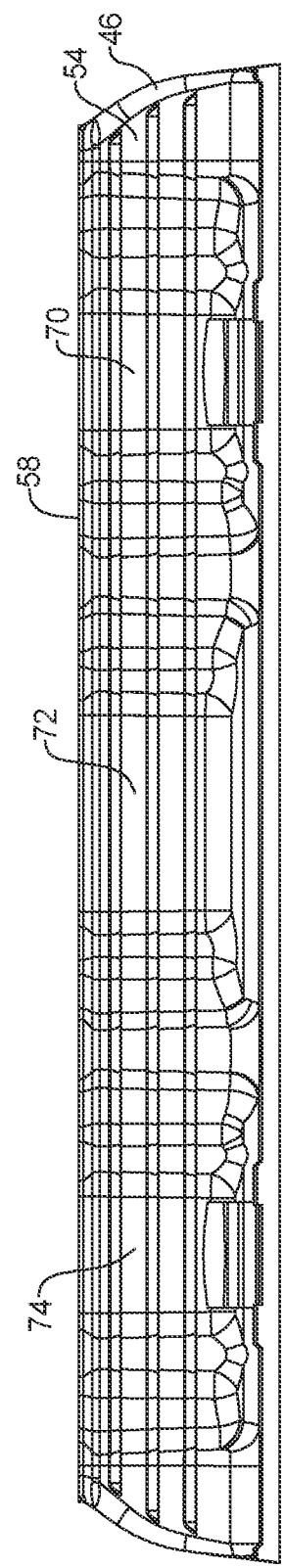
FIG. 7B is a front planar view of the tread of the track of FIG. 2.

Upon viewing an exemplary tread 46 in FIG. 6, each tread 46 includes a plurality of vertically extending stiffening members 68. Each stiffening member 68, as illustrated in FIG. 6, has a substantially tapered conical shape molded into the tread 46 to provide for additional vertical stiffness to provide a controlled flexing along the longitudinal axis of the track 14. As illustrated, each stiffening member 68 is wider at the base 64 and tapers as it reaches the narrow top surface 58. As shown in FIG. 6, the stiffening members 68 are, however, wider at the top surface 58 than the overall thickness or width of the tread 46. Each tread 46 is shaped laterally to provide three cup-shaped front surfaces 54. These cup-shaped surfaces include cup surfaces 70, 72, and 74. Each cup includes an arcuate concave contour 76, shown in dashed lines on tread 46 in FIG. 6. For example, the first cup-shaped surface 70 is formed to include four vertical stiffening members 68 extending from the outside outer edge 69 to an inner surface 71 spanning a pair of track windows 78, further discussed herein.

The first cup 70 has the arcuate concave contour 76 and is positioned or centered relative to the track windows 78. Similarly, cup 74 is also formed with four vertical stiffening members 68, one at an outer edge 73 and the opposed opposite end 75 spanning and positioned the other side of track window 78. Each cup 70 and 74 is centered about the track windows 78 where the most force is applied to the track 14. Cup 72 is centered along the longitudinal axis 50 and positioned between cup 70 and 74. Cup 72 also includes four vertical stiffening members, each member 71 and 75 being common to one of the vertical stiffening members from cup 70 and cup 74, respectively. Each cup 70, 72, and 74 provides further vertical rigidity, as well as holds or grabs and contains snow upon rotating from the top of the track 14 to the bottom of the track, as each tread 46 cuts into the snow. Such a configuration holds the snow to provide further friction to grab and propel the snowmobile 10. Additionally, this configuration also reduces side biting in turns and promotes a lateral slide to promote a smoother and more controlled turn at various speeds In order to promote and control the lateral slide and reduce side biting, the overall width profile or area where the tread 46 is contained can be illustrated to be positioned between two parallel boundaries or planes 80, as illustrated in FIG. 6. The distance 77 between the parallel boundaries 80 is typically 1 inch and can vary between a range of about 0.5 inches to about 2 inches. By providing such a narrow window or distance 77 for the tread pattern between the two parallel boundaries 80, enhanced grabbing and engagement of the snow surface is provided, while reducing side biting and promoting lateral sliding. Again, this promotes and improves hole shot and forward bite and improves cornering speed with controlled slides in cornering with reduced side bite.

The tread 46 has a continuous height of about 1.75 inches that extends the full transverse width 48 of the track 14. The tread height can range between about 1 inch to about 4 inches and have at least about a 1 inch height to provide the improved performance noted herein. Additionally, each pitch 52 is spaced apart by about 2.52 inches. In other words, each pitch or distance between the noted reinforcing rods 66 is about 2.52 inches, illustrated as reference numeral 82 in FIG. 8 and can range between about 2 inches to about 4 inches.

Returning to FIG. 2 and FIGS. 8-9, positioned longitudinally along the track are a pair of a plurality of track windows 78 with a pair of track windows 78 spaced apart laterally and extending longitudinally, as illustrated in FIG. 2. Track windows 78 are positioned between each pitch 52. Positioned on each reinforcing bar 66 is a guide clip 84. Each guide clip 84 is clipped over the reinforcing bar 66 and is positioned around the bar or rod 66. Each clip 84 includes a pair of turned up 90° edges on an inner surface of each clip 84 that rides on a slide rail beam in order to guide the track 14 and prevent the track 14 from sliding off the rail. Positioned opposite each clip 84 on at each pitch 52 is a protruding internal drive lug 86 that extends substantially perpendicular from an inner drive surface 87. The track 14 is propelled or driven by both an internal and external sprocket drive having a convolute and an involute drive system or drive sprocket, as is known in the art. This drive sprocket engages the drive lugs 86, as well as the track window 78 and clips 84 to propel and drive the track 14, as is known in the art.

The distance between each tread 46 is two pitch lengths 82 such that each tread 46 is positioned at every other pitch 52, as illustrated in FIGS. 2 and 8. Again, the pitch 52 is the distance between each reinforcing rod 66 identified by dimension 82. Such a spacing of the tread 46 provides a wider gap between treads 46 to ensure sufficient snow buildup or traction in the snow as the track grabs significant amounts of snow during high acceleration. As illustrated in FIG. 2, between each tread 46 is a substantially smooth track portion 88 having an approximate surface area of about 60 square inches between each lateral side wall 47 and 49 and between a pair of treads 46 that is substantially unencumbered with surface texturing and is simply a substantially smooth surface, except for where a molded reinforcing rod 66 is positioned. The smooth track portion 88 can have a surface area between about 30 square inches to about 112 square inches. Such a smooth surface provides for a thinner track 14 in these large areas, thereby reducing weight of the overall track, such as by about ½ pound from a total weight of the track being about 44 pounds. Such a configuration also improves performance of the overall snowmobile 10.

Again, the endless track 14, as illustrated, provides for a continuous and uninterrupted full height and full width tread 46 having at least a height of 1 inch. Each tread 46 is positioned or spaced at every other pitch 52 or two pitch lengths apart. Each tread 46 is also confined to a boundary 80 of about 1 inch. The front surface 54 of the tread 46 also defines the three cups 70, 72, and 74. Such a construction of a tread 46 provides for improved hole shot and forward bite in all snow conditions, including powder, ice, wet, and heavy snow conditions. Improved corner speed and improved lateral sliding are provided by such a tread 46, while reducing side biting. This enables the track 14 to provide optimized snowmobile performance in all conditions, as well as on all terrains.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An endless track for use in propelling a snowmobile, comprising:
    an inner drive surface extending between a first lateral side and a second lateral side, the inner drive surface having a plurality of inner drive lugs to drive and rotate the endless track;
    an outer ground-engaging surface extending between the first lateral side and the second lateral side, the outer ground-engaging surface having a plurality of treads extending from the outer ground-engaging surface, at least one tread extending continuous and uninterrupted from the first lateral side to the second lateral side a full width of the endless track; and
    a reinforcing rod extending laterally between the first lateral side and the second lateral side at each pitch of the endless track;
    wherein the at least one tread defines three cup-shaped front concave surfaces extending between the first lateral side and the second lateral side, the three cup-shaped front concave surfaces each having an arcuate concave contour with a center cup centered along a longitudinal axis of the endless track and a first cup on one side of the center cup and a second cup on an opposite side of the center cup;
    wherein each tread of the plurality of treads is longitudinally spaced at every other pitch of the endless track.

2. The endless track of claim 1, wherein at least one tread has a continuous height from the first lateral side to the second lateral side the full width of the endless track.

3. The endless track of claim 2, wherein the height is 1.75 inches.

4. The endless track of claim 2, wherein the height is at least 1 inch.

5. The endless track of claim 2, wherein the height extends from the outer ground-engaging surface between a range of 1 inch to 4 inches.

6. The endless track of claim 1, wherein each of the plurality of treads is spaced longitudinally along the endless track with each tread extending continuous and uninterrupted from the first lateral side to the second lateral side the full width of the endless track.

7. The endless track of claim 1, wherein the at least one tread is contained within a lateral boundary defined by two parallel planes that are substantially perpendicular to the longitudinal axis of the endless track.

8. The endless track of claim 7, wherein the two parallel planes are separated by a dimension of 1 inch.

9. The endless track of claim 7, wherein the two parallel planes are separated by a dimension of between the range of 0.5 inches to 2 inches.

10. The endless track of claim 1, wherein the at least one tread includes a plurality of vertically extending stiffening members spaced apart laterally along the at least one tread, each cup including four stiffening members.

11. The endless track of claim 6, wherein the outer ground engaging surface between a pair of treads and the first lateral surface and the second lateral surface is unencumbered with surface texturing.

12. The endless track of claim 11, wherein the unencumbered surface area is 60 square inches.

13. The endless track of claim 11, wherein the unencumbered surface area is between 30 square inches and 112 square inches.

14. The endless track of claim 1, wherein at least one track window is defined through the endless track between each reinforcing rod to provide a plurality of track windows extending longitudinally along the endless track.

15. An endless track for use in propelling a snowmobile, comprising:
    an inner drive surface extending between a first lateral side and a second lateral side, the inner drive surface having a plurality of longitudinally spaced inner drive lugs to drive and rotate the endless track;
    an outer ground-engaging surface extending between the first lateral side and the second lateral side, the outer ground-engaging surface having a plurality of treads, each tread extending continuous and uninterrupted from the first lateral side to the second lateral side a full width of the endless track, each tread having a top surface with a full continuous height extending the full width of the endless track; and a reinforcing rod extending laterally between the first lateral side and the second lateral side at each pitch of the endless track;

wherein each tread of the plurality of treads is longitudinally spaced at every other pitch of the endless track.

16. The endless track of claim 15, wherein the continuous height of each tread is 1.75 inches.

17. The endless track of claim 15, wherein each tread defines three cup-shaped front concave surfaces extending between the first lateral side and the second lateral side.

18. An endless track for use in propelling a snowmobile, comprising:

an inner drive surface extending between a first lateral side and a second lateral side, the inner drive surface having a plurality of inner drive lugs to drive and rotate the endless track;

an outer ground-engaging surface extending between the first lateral side and the second lateral side, the outer ground-engaging surface having a plurality of treads extending from the outer ground-engaging surface; and a reinforcing rod extending laterally between the first lateral side and the second lateral side at each pitch of the endless track;

wherein each tread of the plurality of treads is longitudinally spaced at every other pitch and at every other reinforcing rod of the endless track.

19. The endless track of claim 18, wherein at least one tread extends continuous and uninterrupted from the first lateral side to the second lateral side a full width of the endless track.

20. The endless track of claim 19, wherein the at least one tread has a continuous height from the first lateral side to the second lateral side the full width of the endless track.

21. The endless track of claim 20, wherein the height is 1.75 inches.

22. An endless track for use in propelling a snowmobile, comprising;

an inner drive surface extending between a first lateral side and a second lateral side, the inner drive surface having a plurality of longitudinally spaced inner drive lugs to drive and rotate the endless track; and an outer ground-engaging surface extending between the first lateral side and the second lateral side, the outer ground-engaging surface having a plurality of treads;

wherein each tread of the plurality of treads is longitudinally spaced at every other pitch of the endless track;

wherein a reinforcing rod is positioned at each pitch of the endless track.

23. The endless track of claim 22, wherein each tread extends continuously and uninterrupted from the first lateral side to the second lateral side a full width of the endless track, each track having a full continuous height extending the full width of the endless track.

\* \* \* \* \*